Feb. 12, 1924.

F. M. RHED

DELIVERY WAGON

Filed Oct. 17, 1919

1,483,112

Witness: H. P. Ireland.

Inventor
Floyd M. Rhed.
By Parker Carter
Attorneys

Patented Feb. 12, 1924.

1,483,112

UNITED STATES PATENT OFFICE.

FLOYD M. RHED, OF KANSAS CITY, MISSOURI.

DELIVERY WAGON.

Application filed October 17, 1919. Serial No. 331,413.

*To all whom it may concern:*

Be it known that I, FLOYD M. RHED, a citizen of United States, residing at Kansas City, in the county of Jackson and State of Missouri, have invented a certain new and useful Improvement in Delivery Wagons, of which the following is a specification.

My invention relates to delivery wagons and particularly to a combined display and delivery wagon which may be used both for delivery and for advertising purposes. In the form illustrated herewith I use a closed body on an automobile chassis and in it I provide three main compartments, one forward compartment for the use of the driver and two rearward compartments one above the other. The lower compartment is covered and is used to carry articles for delivery. The upper compartment is surrounded entirely by glass and in it I position the device for display.

My invention is illustrated more or less diagrammatically in the accompanying drawings, wherein—

Like letters refer to like parts throughout the several figures.

Figure 2:
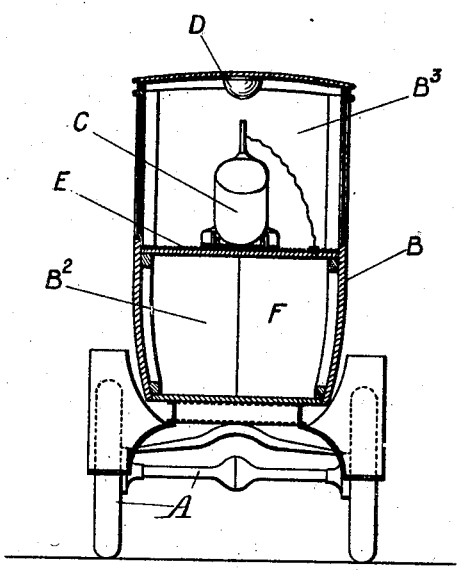
Fig. 2 is a cross section on the line 2—2 of Fig. 1.
Figure 1:
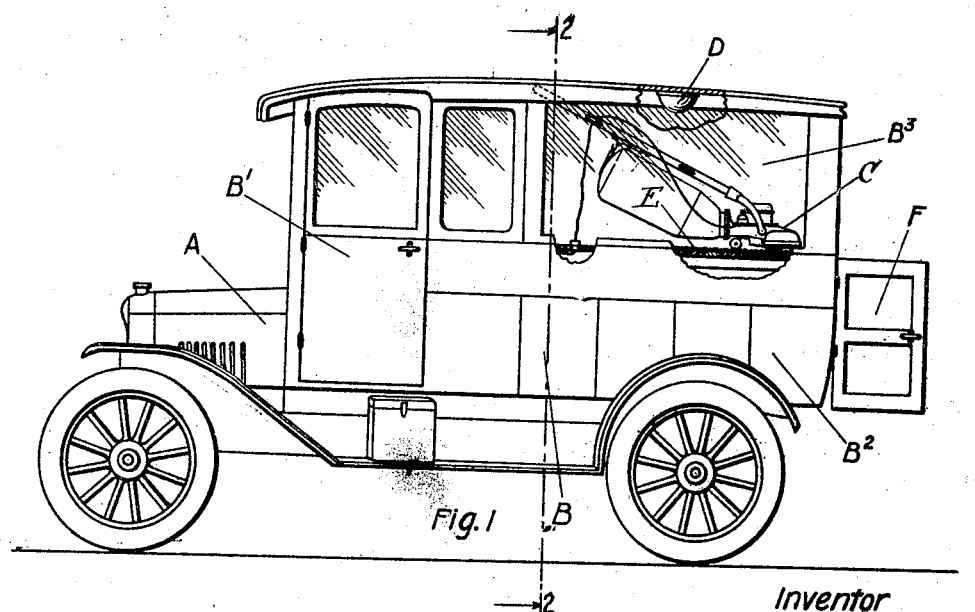
Fig. 1 is a side view of my device.

A is an automobile. B is a delivery body. B¹ is the forward or driver's compartment. B² is the lower rearward compartment adapted to carry articles for delivery. B³ is the upper glass enclosed compartment adapted for display. In it I have positioned a suction sweeper C which is adapted to be operated by electric current from a storage battery or other means. D is a light adapted to furnish illumination so that my invention may be used at night. E is a carpet covering the floor of the upper compartment and upon which the suction sweeper is adapted to operate. The floor of the display compartment is in effect the roof of the storage compartment and is substantially in the same plane as the lower edge of the glass window. F is the storage compartment door.

It will be evident that while I have shown in my drawing an operative device still many changes might be made both in size, shape and arrangement of parts without departing materially from the spirit of my invention and I wish, therefore, that my drawing be regarded as in a sense diagrammatic.

The use and operation of my invention are as follows:

The lower compartment is filled with articles to be delivered. In the upper compartment is placed an article for display. In the particular form illustrated I have shown a suction sweeper. The floor of this compartment is carpeted and the sweeper is connected with the electric current so that it may operate in connection with the carpet in the usual manner so as to illustrate its mode of operation.

The compartment is arranged so that a person of average height will be able to look into it to see the carpet and the mode of operation of the sweeper. I also have provided a light in this compartment so that as the automobile is driven about at night it will serve as a display and advertising medium quite as well as during the day.

As an automobile embodying this body is driven about for the usual purposes of delivery the article in it is prominently displayed and its characteristics and merits are brought clearly and effectively to the attention of a large number of people while they are in their homes or in their immediate neighborhood. For example, when an agent is delivering a machine or installing one this delivery wagon will stand in front of the house and persons passing or living in the immediate vicinity will be able to see the device within the car and thus the advertising purpose will be effected. The suction cleaner may be connected with the current in such a way that it alternately operates and discontinues to operate, the bag being inflated and deflated accordingly. All this adds to the advertising effect.

I claim—

A movable display exhibit including in combination a display and delivery vehicle formed with a forward driving compartment, a rearward lower closed delivery compartment, and superimposed thereupon a closed glazed display compartment, the floor of said compartment being substantially on a level with the lower edge of the glazing and being carpeted, and in combination with said vehicle a floor cleaning machine mounted within said display compartment upon said carpet in its normal operative position, and means within said vehicle for furnishing operating current to said device so that it may be displayed in operation.

In testimony whereof, I affix my signature in the presence of two witnesses this 25th day of September, 1919.

FLOYD M. RHED.

Witnesses:
 ALICE G. MOSS,
 M. RUTH WHITSETT.